UNITED STATES PATENT OFFICE.

SYDNEY ARMSTRONG, OF BURTON-UPON-TRENT, ENGLAND.

BREWING, DISTILLING, AND THE LIKE.

No. 915,150.  Specification of Letters Patent.  Patented March 16, 1909.

Application filed May 12, 1908. Serial No. 432,426.

*To all whom it may concern:*

Be it known that I, SYDNEY ARMSTRONG, of Bladon Castle, Burton-upon-Trent, county of Stafford, England, brewer, have invented certain new and useful Improvements in or Relating to Brewing, Distilling, and the Like, of which the following is a specification.

This invention consists of a new or improved process relating to brewing, distilling and the like.

Brewers have hitherto been unable to brew as sound a beer during the summer months as they can during the winter, nor have distillers been able to obtain during the summer the same output of the same kind of alcohol they require as they can in the winter, in spite of the fact that they have conducted the fermenting at exactly correct temperatures.

In all breweries there are particular micro-organisms present which are detrimental to the fermentation. These vary considerably with the locality, their prevalence in the atmosphere depending upon the existence of local conditions favoring their production. A good example is *Saccharomyces ellipsoideus* which is a frequent source of trouble, resulting in the production of beers having a slightly unpleasant taint and difficult to fine.

The improved process is characterized by the fact that actinic light is excluded or practically excluded from the wort during the particular period of the manufacture at which the wort is liable to become infected by the said detrimental micro-organisms, namely during the period when the wort is exposed to the air between the boiling and fermenting operations and preferably also during a portion of the fermenting operation.

In practicing the process all coolers, refrigerators and preferably also the fermenting vessels, should be in rooms so constructed that actinic light may be excluded at will. Non actinic light may be admitted if desired. For example the cooling vessels may be contained in a closed room arranged to exclude light but to freely admit air; said room is provided with red windows for admitting the necessary light for inspection purposes; or the room may be fitted with windows provided with shutters adapted to entirely close them, or with red blinds, or a red lamp may be used. In fact any suitable arrangement may be provided to carry out the improved process.

By practically excluding white light from the wort from the time it leaves the boiling copper until it reaches the fermenting vat and also during the early stages of fermentation good results are secured, a red light being used for purposes of inspection. I have also found it of advantage to increase the intensity of the light, by admitting actinic light, when the yeast has acquired sufficient strength.

By means of the improved process the difficulties previously caused by detrimental micro-organisms as above mentioned are obviated and substantially uniform results can be obtained at all times of the year.

The process will therefore be of great value to the brewing and distilling industries, the conditions of which, as is known, are such as to necessitate continuous working throughout the year.

Care should be taken to keep the temperature of the wort within the usual and proper limits as heretofore. The cooling tanks and other vessels should also be of the ordinary kind, to insure proper aeration and oxidation of the wort.

It must be clearly understood that my invention does not consist in the exclusion or selective admission of light during brewing or distilling generally, but only at the stages indicated above of such processes.

What I claim and desire to secure by Letters Patent is:—

1. In brewing, distilling and the like, the process which consists in exposing the wort to the free atmosphere between the boiling and fermenting operations in the substantial absence of actinic light.

2. In brewing, distilling and the like, the process which consists in exposing the wort to the free atmosphere between the boiling and fermenting operations in the substantial absence of actinic light, and fermenting the wort until the yeast has acquired strength in the substantial absence of such light.

In witness whereof, I have hereunto signed my name in the presence of two subscribing witnesses.

SYDNEY ARMSTRONG.

Witnesses:
CHARLES GEORGE MATTHEWS,
FRANCIS EDWARD LOTT.